United States Patent [19]

Röhlig

[11] 4,071,937
[45] Feb. 7, 1978

[54] FILTER CARTRIDGE WITH FOLDED FILTER SHEATH

[75] Inventor: Rainer Röhlig, Radevormwald, Germany

[73] Assignee: Sintermetallwerk Krebsoge GmbH, Radevormwald, Germany

[21] Appl. No.: 713,226

[22] Filed: Aug. 10, 1976

[30] Foreign Application Priority Data

Aug. 14, 1975 Germany .............................. 2536276

[51] Int. Cl.² .............................................. B22F 3/24
[52] U.S. Cl. ..................................... 29/420; 29/420.5
[58] Field of Search ................ 29/163 SF, 420, 420.5; 75/200, 208, 214, 226; 210/315, 342, 493 B, 493 R, 496, 510

[56] References Cited

U.S. PATENT DOCUMENTS

| 2,267,918 | 12/1941 | Hildabout | 210/510 |
| 2,957,235 | 10/1960 | Steinberg | 210/493 B |
| 2,963,163 | 12/1960 | Veres | 210/496 |
| 3,241,681 | 3/1966 | Pall | 210/493 |
| 3,656,946 | 4/1972 | Inque et al. | 75/200 X |
| 3,984,044 | 10/1976 | Breton et al. | 29/163.5 F |

Primary Examiner—Charles N. Hart
Assistant Examiner—Richard W. Burks
Attorney, Agent, or Firm—Karl F. Ross

[57] ABSTRACT

A filter cartridge has a fluid-permeable support body formed externally with ribs and is closely surrounded by a "folded" (e.g. corrugated) sheath of sintered material. The support body may likewise be formed of sintered material and preferably the sheath and support body are sintered together.

1 Claim, 3 Drawing Figures

U.S. Patent  Feb. 7, 1978  4,071,937
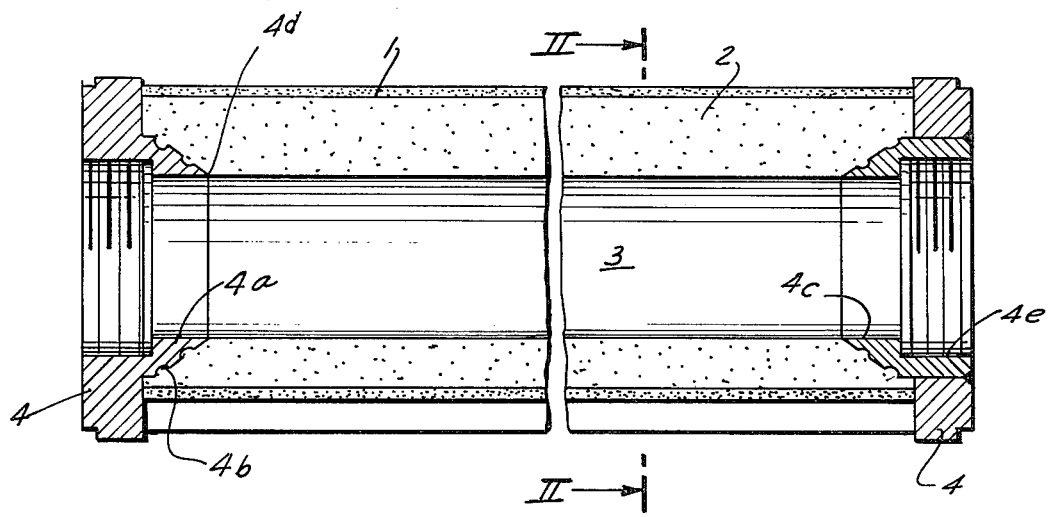
FIG. 1
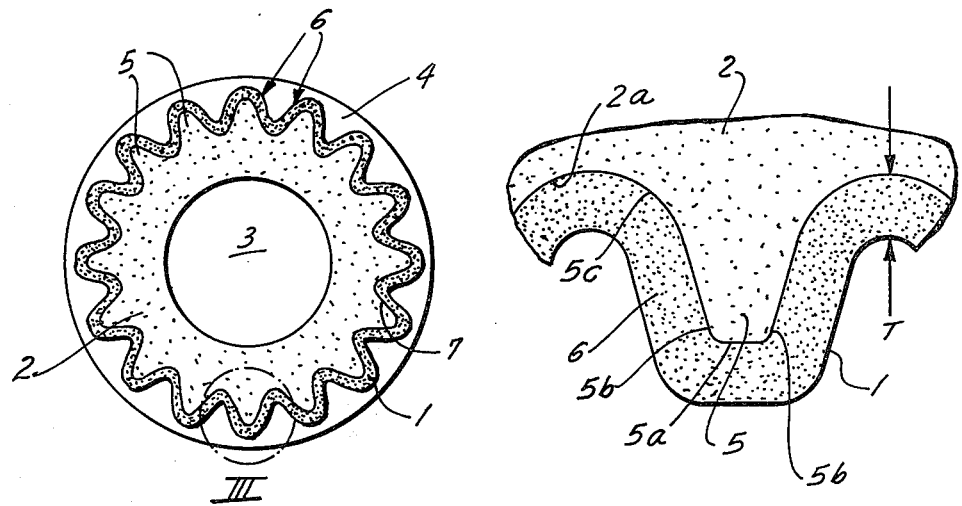
FIG. 2
FIG. 3

FILTER CARTRIDGE WITH FOLDED FILTER SHEATH

FIELD OF THE INVENTION

The present invention relates to a filter cartridge and, more particularly, to a filter cartridge in which the filtering element consists of a fluid-permeable body of sintered material.

BACKGROUND OF THE INVENTION

A filter cartridge for the filtering of water to remove particulates therefrom, for the filtering of chemical slurries, for the filtering of hydrocarbons such as oils or the like to eliminate particulates therefrom, e.g. in motor vehicle recirculating oil systems, generally comprises a support structure and at least one filter layer carried by the support structure and designed to trap particulates. The support structure can be designed so that liquids can be sucked into the interior, forced through the interior or otherwise so as to cause the liquid phase to penetrate the filter layer and allow particulates to deposit thereon.

It has been proposed to provide the filter layer as a wire mesh or fabric and to form the filter layer around a generally cylindrical and fluid-permeable support which may be tubular so that the interior or support body forms a passage. The wire mesh or fabric can be seamed or provided in a multiplicity of turns in a spiral pattern and, to increase the area per unit volume, can be "folded".

The term "folded" is used here to refer to a corrugated pattern of the filter layer so that, for a given diameter, the available filtering surface is greater than that of a corresponding right circular cylinder.

It has also been proposed to provide filter layers of sintered material, i.e. a porous mass of particles which are fused together so as to retain the porosity. Such a filter layer has advantages over a wire-mesh or fabric filter in that the pores can be more readily controlled smaller, the filter layer is more capable of withstanding chemical stress and hence high pressure differential, and depending upon the material from which the filtered layer is constituted, the filter can be more resistant to chemical attacks and other effects including temperature. As disclosed in German GEBRAUCHSMUSTER DT-Gbm 1872428, such sintered filter layers have invariably been cylindrical and provided upon a cylindrical support.

OBJECTS OF THE INVENTION

It is the principal object of the present invention to provide a filter cartridge which constitutes an improvement over both wire mesh or wire fabric filters and the cylindrical sintered filters mentioned above.

Another object of the invention is to provide a filter cartridge having a highly effective filtering surface, readily controllable filtering characteristic and economical construction.

It is also an object of the invention to provide an improved method of making a filter cartridge.

SUMMARY OF THE INVENTION

These objects are attained, in accordance with the present invention, with a folded-layer filter constituted of sintered material which is insensitive to tangential stress and hence is capable of withstanding high pressure differentials by providing, in the filter cartridge, a generally tubular support body having a ribbed outer periphery carrying the sintered filter layer so that the latter conforms fully to this periphery and hence is in total surface contact therewith.

The term "total surface contact" is here intended to define a state in which the inner surface of the folded or currugated sintered filter layer likewise a continuous, complete and total contact with the entire external periphery of the complementarily contoured ribbed support body. In other words the inner surface of the sintered filter sleeve, sheath or shell is completely complementary to lie or hug in continuous contact the ribbed outer periphery of the support.

Under operating condition, therefore, the effective filter layer is always supported internally, at all points, by the outer periphery of the support so that tangential stresses cannot arise and the system can operate with considerable pressure differentials thereacross in spite of the fact that the filter sheath is practically incompressible in the tangential and radial directions.

According to the present invention the filter sheath is of constant thickness throughout, i.e. its internal profile conforms to its external profile. It should be thus understood that, because the sintered sheet constituting the main filtering element, is practically rigid it cannot be formed by a folding deformation of planar element. The filter sheath, according to the invention, must be shaped into its corrugated configuration, pressed and sintered.

Advantageously, the support body consists of a sintered structure as well and is formed in a similar manner, i.e. pressed and sintered into its final shape.

Notwithstanding the fact that the "folded" filter sheath is formed in one piece without deformation, it retains the static strength of a folded structure as described in LUEGER in LEXIKON DER BAUTECHNIK, 1966, pgs 416, 417. Furthermore, because of the corrugated or folded character, the sheath has an effective surface area of a folded filter.

The filter sheath and/or sintered support can be made from any of a number of sinterable materials, for example metal powders, metal powder with metal fiber or wire mixtures, sinterable ceramics, depending upon the desired resistance to chemical attack by the liquid to be filtered. Most advantageously the sintered material is a metal powder resistant to chemical attack such as nickel powder.

While it is possible, within the framework of the invention, to separately form the sintered filter sheaths and the support body and insert the support body in the sheath or fit the sheath over the support body, I prefer, as described below, to form them together.

When, however, the two are separately formed and are fitted together, I may use thermal shrinkage effects to ensure a tight fit between the sheath and the support body so as to obtain the aforementioned desired total surface contact. Thus the sheath may be heated and the support body chilled before they are fitted together and allowed to reach room temperature. In this case the sheath shrinks while the support body expands to fit them together in total surface contact free from any gap or spacing between them. This includes the possibility that impurities or the like can be trapped between the sheath and support body.

According to the preferred embodiment of the invention, a total surface contact between the sheaths and the support body is ensured with complete conformity of the ribbed profile to the trough profile of the sheath by sintering the support body and the sheath to each other together in a single operation. The sintered material of the support body and the sheath can be pressed together and sintered so as to, at the same time, fuse the particles of the sheath together, fuse the particles of the support together and fuse the sheath particles to the support particles at their interface. The bond between the sheaths and the support may be well defined or may be graduated.

According to an important feature of the invention the cartridge is provided with at least one headpiece, e.g. an annular body to which a pipe or other fitting may be threaded. The headpiece may be applied, in conventional ways to the support body by welding or soldering, although it is preferred to secure the headpiece to the support body simultaneously with the sintering of the latter. When the support body and the sheath are sintered together, both may be sintered to the headpiece or to both headpieces if two such headpieces are provided at opposite ends of the filter cartridge.

According to another feature of the invention, the support body and filter sheath may have different pore diameters and/or different pore volumes with, preferably the pore diameter of the filter sheath being smaller than the pore diameter of the support body. In either case, the dimension is determined by the requirements for the particular filter. Usually the filter sheath will constitute the primary barrier to particulates although it is also possible that the support body will constitute the primary barrier to particulates while the filter sheath performs a secondary function.

It is advantageous, with the system of the present invention, that the effective filter surface is completely defined under all operating conditions and undergoes no deformation which can reduce the effective area of the filter surface.

The filter cartridge of the invention can be used for very high pressure differentials and can be fabricated in a simple manner, e.g. by isostatic pressing and sintering. Suitable sintering techniques are described in U.S. Pat. No. 3,656,946.

The particulate material for the support body can be formed with its ribs against a core, e.g. a steel mandrel by isostatic pressure as described in this latter patent, whereupon the sinterable material for the filter sheath can be applied and isostatic pressure again used. The resulting compact can be heated to sintering temperature. The core can remain in the compact until after sintering. If, before the filter sheath is applied, the support body is presintered, the core can be removed during application of the filter sheath by isostatic pressure. A cold deformation can be used, either only for the support body or for the complete filter cartridge to adjust the pore volumes.

During the isostatic compaction of the filter sheath, the previously pressed support body serves as the supporting core or forming tool for the inner profiling of the sheath. The headpiece or two such headpieces can be applied during pressuring of the support body and/or the filter sheath and then sintered together therewith. The corrugations are ribs on the support body and hence the folds on the filter sheath can be longitudinally extending corrugation-like structures or the like along respective helices so that the ribs have a screw thread pattern.

BRIEF DESCRIPTION OF THE DRAWING

The above and other objects, features and advantages of the present invention will become more readily apparent from the following description, reference being made to the accompanying drawing in which:

FIG. 1 is a longitudinal section through a filter cartridge according to the invention;

FIG. 2 is a section taken along the line II—II of FIG. 1; and

FIG. 3 is a detail of the region III of FIG. 2, drawn to an enlarged scale.

SPECIFIC DESCRIPTION

The filter cartridge shown in the drawing comprises basically a filter sheath 1 of sintered material closely hugging a porour support body 2 of sintered material and a pair of headpieces 4 on either end of the elongated support body 2. The latter defines a flow passage 3 of cylindrical cross section extending throughout the length of the filter.

The headpieces 4 each have a boss 4a provided with grooves 4b facilitating the anchoring of each headpiece in the sintered material of the body 2. A cylindrical bore 4c in each boss 4a has the same diameter as that of the passage 3 and is flush therewith at the junction 4d.

Each headpiece 4 also is formed with a threaded bore 4e which adapted to receive a pipe or other externally threaded fitting.

The folded sheath 1 and the support body 2 are constituted, as noted, from sintered material which has been represented in both cases by stippling, the bore diameter of the sheath 1 being smaller than that of the support body 2.

As can be seen especially from FIGS. 2 and 3, the support body 2 is formed with supporting ribs 5 which extend longitudinally and have a generally trapezoidal configuration as shown best in FIG. 3. The ribs 5 thus may have small cylindrical bases 5a with oppositely inclined conical flanks 5b diverging from the small base 5a. In the troughs 2a between the ribs 5, the flanks 5b merge into curves 5c.

The filter sheath 1, being of uniform thickness T, thus has ribs or corrugations as shown at 6 of complementary contour.

The sheath 1 joins the support body 2 practically without a seam and are preferably formed, as noted, by sintering the sheath onto the support body. As a result the two lie in total surface contact along their interface 7. In this embodiment also the headpiece 4 is sintered to the support body 2 and the sheath 1.

As an example, the sheath 1 is formed from nickel particles of relatively small particle size, support body 2 from nickel particles of larger particle size, and the heads 4 of nickel-chromium stainless steel.

I claim:

1. A method of making a filter cartridge comprising the steps of:
    isostatically pressing sinterable material against a smooth core to form a tubular support body having a plurality of support ribs extending therealong;
    isostatically pressing a sinterable filter sheath substantially of constant wall thickness against said support body;
    pressing a headpiece onto said support body; and
    sintering said sheath, said support body and said headpiece simultaneously to bond them together.

* * * * *